(12) United States Patent
Nussel et al.

(10) Patent No.: US 9,015,595 B2
(45) Date of Patent: Apr. 21, 2015

(54) SELF-TARGETING LOCAL AD SYSTEM

(75) Inventors: Dale Nussel, Mahomet, IL (US); Allie K. Watfa, Urbana, IL (US); Jonathan Kilroy, Campaign, IL (US)

(73) Assignee: Yahoo! Inc., Sunnyvale, CA (US)

( * ) Notice: Subject to any disclaimer, the term of this patent is extended or adjusted under 35 U.S.C. 154(b) by 625 days.

(21) Appl. No.: 12/690,706

(22) Filed: Jan. 20, 2010

(65) Prior Publication Data

US 2011/0179359 A1 Jul. 21, 2011

(51) Int. Cl.
| | |
|---|---|
| G06F 3/00 | (2006.01) |
| G06Q 30/00 | (2012.01) |
| G06Q 30/02 | (2012.01) |
| G06F 3/0484 | (2013.01) |

(52) U.S. Cl.
CPC ............ G06Q 30/02 (2013.01); G06Q 30/0277 (2013.01); G06Q 30/0261 (2013.01); G06F 3/0484 (2013.01); G06Q 30/0242 (2013.01); G06Q 30/0257 (2013.01); G06Q 30/0269 (2013.01); G06Q 30/0272 (2013.01)

(58) Field of Classification Search
CPC .......... G06Q 30/0242; G06Q 30/0257; G06Q 30/0261; G06Q 30/0272; G06Q 30/0277; G06Q 30/0269; G06F 3/0484
USPC ........ 715/738; 705/14.1, 14.19, 14.25, 14.36, 705/14.39, 14.4, 14.41, 14.42, 14.43, 14.44, 705/14.49, 14.5, 14.51, 14.52, 14.53, 14.54, 705/14.55, 14.57, 14.58, 14.6, 14.64, 14.66, 705/14.67, 14.68, 14.69, 14.72
See application file for complete search history.

(56) References Cited

U.S. PATENT DOCUMENTS

| | | | | |
|---|---|---|---|---|
| 7,725,502 | B1 * | 5/2010 | Badros et al. | 705/14.73 |
| 7,962,604 | B1 * | 6/2011 | Morris et al. | 709/224 |
| 8,407,576 | B1 * | 3/2013 | Yin et al. | 715/206 |
| 2002/0010757 | A1 * | 1/2002 | Granik et al. | 709/218 |
| 2002/0027567 | A1 * | 3/2002 | Niamir | 345/738 |
| 2002/0070982 | A1 * | 6/2002 | Hill et al. | 345/835 |
| 2002/0077130 | A1 * | 6/2002 | Owensby | 455/466 |
| 2003/0046161 | A1 * | 3/2003 | Kamangar et al. | 705/14 |
| 2003/0231202 | A1 * | 12/2003 | Parker et al. | 345/730 |
| 2004/0083133 | A1 * | 4/2004 | Nicholas et al. | 705/14 |
| 2006/0070000 | A1 * | 3/2006 | Ichikawa | 715/730 |
| 2006/0149624 | A1 * | 7/2006 | Baluja et al. | 705/14 |
| 2007/0112630 | A1 * | 5/2007 | Lau et al. | 705/14 |
| 2008/0040175 | A1 * | 2/2008 | Dellovo | 705/7 |
| 2008/0052945 | A1 * | 3/2008 | Matas et al. | 34/173 |
| 2008/0086356 | A1 * | 4/2008 | Glassman et al. | 705/10 |
| 2008/0114639 | A1 * | 5/2008 | Meek et al. | 705/10 |
| 2008/0134043 | A1 * | 6/2008 | Georgis et al. | 715/733 |
| 2008/0306999 | A1 * | 12/2008 | Finger et al. | 707/104.1 |
| 2009/0006213 | A1 * | 1/2009 | Lerman et al. | 705/14 |
| 2009/0292608 | A1 * | 11/2009 | Polachek | 705/14.44 |
| 2010/0241507 | A1 * | 9/2010 | Quinn et al. | 705/14.42 |

* cited by examiner

*Primary Examiner* — Eric J Bycer (74) *Attorney, Agent, or Firm* — Brinks Gilson & Lione (57) ABSTRACT

A system for serving localized advertisements receives data that defines an advertisement from an advertiser and determines a geographic location of the advertiser. The system also receives a request to serve an advertisement from a browser operated by a user and determines a geographic location associated with the user. The system communicates the advertisement to the browser if the geographic location associated with the user matches the geographic location of the advertiser.

22 Claims, 7 Drawing Sheets

SELF-TARGETING LOCAL AD SYSTEM

BACKGROUND

The Internet has emerged as a powerful advertising tool. It is commonplace to see advertisements on many web sites. For example, advertisements may be displayed on search web sites and may be targeted to individuals based upon search terms provided by the individuals. Other web sites, such as news and sports web sites, may provide space for advertisements. The owners of these web sites may sell advertising space to advertisers to offset the costs associated with operating the web sites as well as to turn a profit.

However, submitting advertisements through existing systems can be a time consuming process. These systems typically require an advertiser to associate a given advertisement with key words, such as search terms; properties, such as a specific web site or web site that caters to a specific audience; a position, such as the top or bottom of a web page; etc. Advertisers may have to bid to have their advertisements displayed, for example, in response to a search request. The advertisement placement process can be overwhelming for an unsophisticated advertiser who is primarily interested in advertising locally, such as a local grocer or an auto mechanic.

DETAILED DESCRIPTION

The embodiments below describe an exemplary embodiment of a system that enables the communication of localized advertisements. Generally, the system is configured to determine a location of an advertiser associated with a given advertisement. The system then determines a location associated with a user that generates a web page request via a browser. The system responds to the web page request by providing a web page that includes, among other items, an advertisement region that is configured to display one or more advertisements associated with advertisers that are in the same geographic location as the user.

The embodiments below introduce new and simpler data pipeline design data structures, which correspond to one or more programs that perform a task with reduced user interaction. The embodiments are primarily intended to streamline the advertisement publication process for local small business advertisers by eliminating elements typically required by more complex advertisements systems, such as the requirement for specifying impressions, a number-of-clicks, impression targeting attributes, etc. Rather, information, such as a phone number and address, may sufficiently enable delivery of advertisements to users.

In some embodiments, the determination as to whether an advertisement is to be shown to a browser device is based on a determined geographic location a browser device. The advertisements communicated to a browser device may change dynamically based on the geographic location of the browser device. For example, advertisements communicated to a browser enabled smart phone may change depending on the geographic location of the smart phone.

In some embodiments, a weighting is applied to a localized advertisement to affect the frequency and/or the order in which advertisements are displayed on the browser device. In some implementations, the weight of the advertisement is affected by an upgrade request from a local advertiser. A request to upgrade the advertisement may result in a given advertisement being displayed more frequently and/or to affect the relative position of the advertisement in a list of advertisements. The weight associated with an advertisement may also be based on ratings given to an advertisement by users viewing the advertisements.

In some implementations, a user of a browser device may specify advertisement preference settings operable to filter the advertisements communicated to a browser device to those types of advertisements desired by the user.

Figure 1:
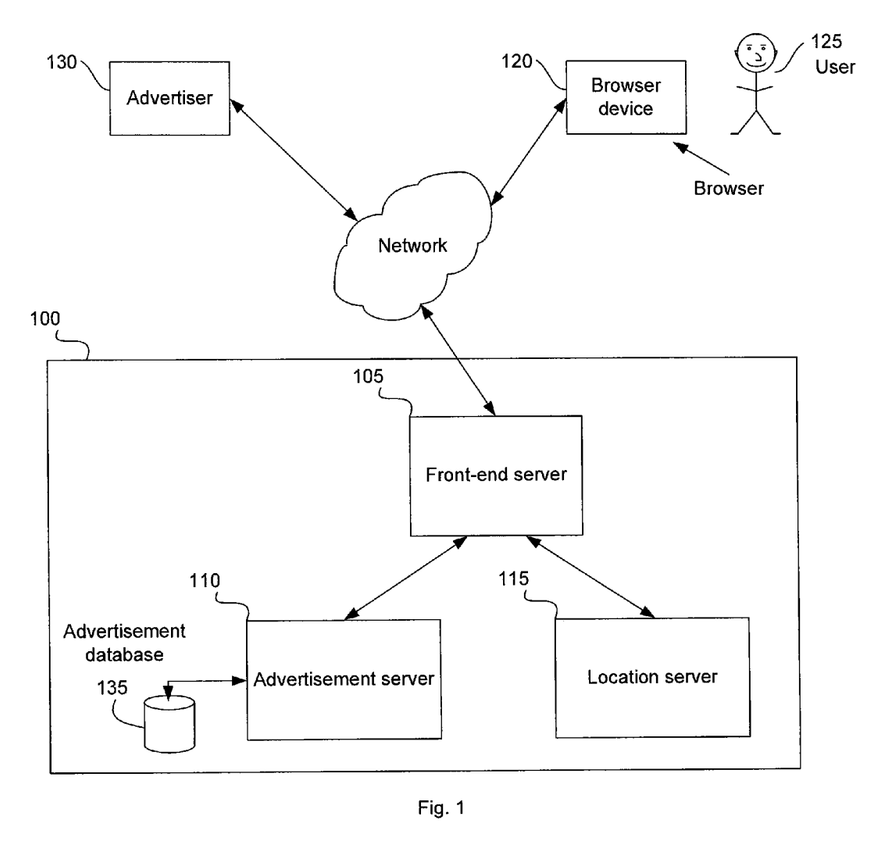
FIG. 1 is a system for serving localized advertisements.

FIG. 1 is a system 100 for serving localized advertisements. The system 100 includes a front-end server 105, an advertisement server 110, an advertisement database 135, and a location server 115. The various components of the system 100 may reside on a single computer or be distributed among several computers interconnected by a communication network.

The front-end server 105, advertisement server 110, and location server 115 may correspond to an Intel®, AMD®, or PowerPC® based computer or a different computer. The front-end server 105, advertisement server 110, and location server 115 may include an operating system, such as a Microsoft® Windows®, LINUX™, or other Unix® based operating system. The front-end server 105, advertisement server 110, and location server 115 may be configured to communicate with other computers via an interface, such as a network interface.

The front-end server 105 may include code, logic, and/or other circuitry that enables the reception of a request to serve a web page, such as a Yahoo!® front page, to a browser device 120, and to communicate the web page to a browser operating on the browser device 120. The browser device 120 may correspond to a computer, smartphone, or any other device associated with an internet address and capable of displaying a web page. The web page is a data file including hypertext markup language (HTML) code or other information to cause the user's browser to produce a particular display on the browser device 120 operating the browser. For example, the web page communicated may include information, such as news articles, links to favorite web sites, and advertisements. The advertisements may include localized advertisements that are associated with advertisers 130 located in the same geographic region as the user 125. For example, the zip code associated with the advertiser 130 and the user 125 may match.

In some implementations, the front-end server is configured to provide a web page that enables an advertiser 130 to upload an advertisement. The web page may enable specifying advertiser identifying information, such as the name and address of an advertiser 130. The web page may also enable uploading the content of the advertisement. For example, the web page may enable uploading an image and/or text of an advertisement.

The advertisement server 110 may include code, logic and/or other circuitry that enables storing advertising information communicated by an advertiser 130 to an advertisement database 135. The advertisement server 110 may also be configured to communicate advertisements stored in the advertisement database 135, such as localized advertisements or other advertisements, to a browser operating on the browser device 120. In some implementations, the advertisement is communicated directly to the browser operating on the browser device 120. For example, browser code operating in the browser may be operable to cause the browser to request an advertisement from the advertisement server 110. In other implementations, the advertisement may be communicated via the front-end server 105. That is, the front-end server 105 may serve as a proxy for the communication of advertisements from the advertisement server 110.

The advertisement database 135 may include information that defines one or more advertisements. For example, data that defines the content of an advertisement, such as pixel data and/or text data, may be stored in the database 135. Data that defines the geographic location of an advertiser 130 associated with the advertisement is also stored in the advertisement database 135. For example, the data may include the address of the advertiser 130, a closest intersection to the advertiser 130, a latitude and longitude of the advertiser 130, and/or other information that enables determining the geographic location of the advertiser 130.

The location server 114 may include code, logic and/or other circuitry that enables determining the location of an advertiser 130 and a user 125. The location server may be configured to determine a location based on, for example, an IP address associated with the advertiser 130 and the user 125. For example, the location server may determine the location of an advertiser 130 by analyzing the IP address associated with the advertiser's browser (not shown). The IP address may be maintained by a domain name service (DNS) that enables other systems, such as the location sever 114, to determine a physical location associated with an IP address registered with the DNS. The location server 115 may also be configured to determine the location of a user 125 by analyzing the IP associated with the browser operating on the browser device 120. The location server 115 obtains location information for the user 125 from any available source and may update that information as more accurate or more current location information becomes available. The location information is provided as requested or as needed.

The location information associated with the advertiser 130 may be stored to the advertisement database 135 and associated with advertisements provided by the advertiser 130. The location information enables matching an advertisement to a user 125 based on the geographic location of the user.

Figure 2A:
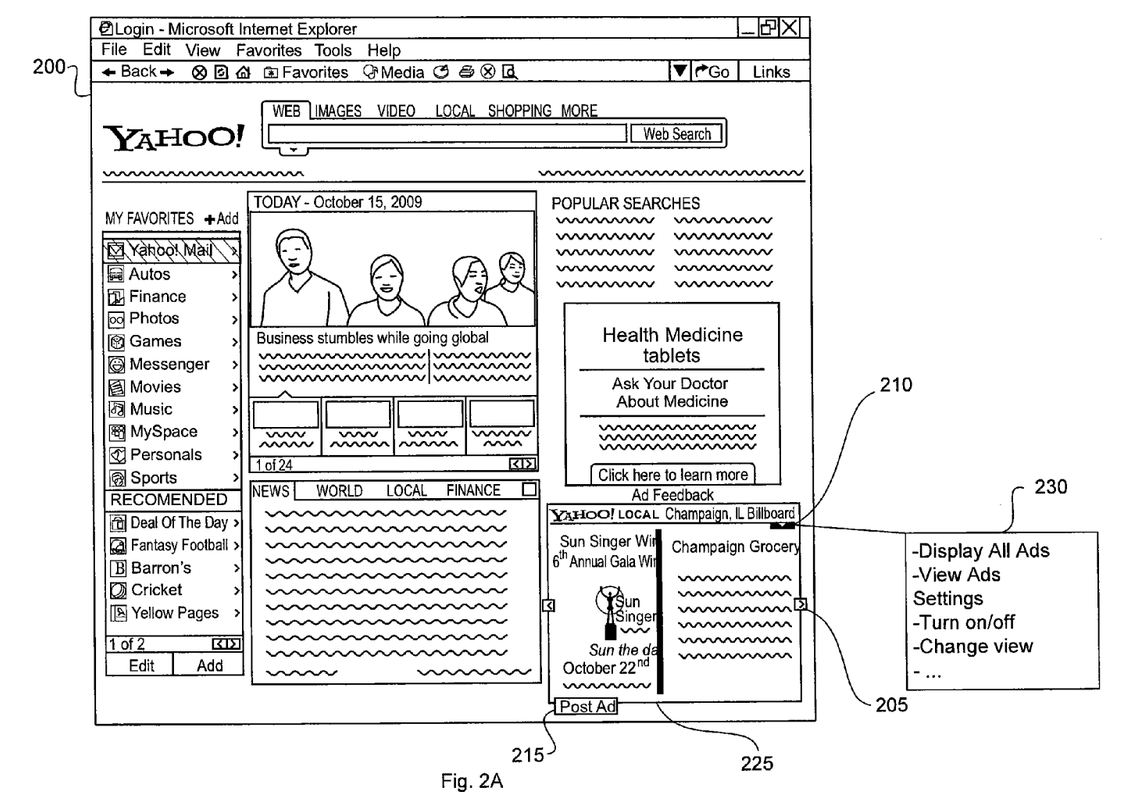
FIG. 2A is an exemplary web page that may be communicated to a user.

FIG. 2A is an exemplary web page 200 that may be communicated to a user. For example, the web page 200 may be communicated to a user 125 (FIG. 1) via the front-end server 105 of FIG. 1 in response to a request received from the user 125. The exemplary web page 200 may correspond to a user's 125 home page and may include various types of information that the user 125 is interested in seeing on a single web page. For example, the web page 200 may include links to favorite web sites, links to news articles, etc. The web page 200 may also include various advertisements, such as sponsored advertisements that are related to content shown on the web page. The advertisements may be banner advertisements or other display advertisements, paid search listing advertisements or any other type of advertisement. Advertisement selection and positioning is controlled, for example, by the front-end server 105, which formats the web page 200 in response to a request from the user.

Figure 2B:
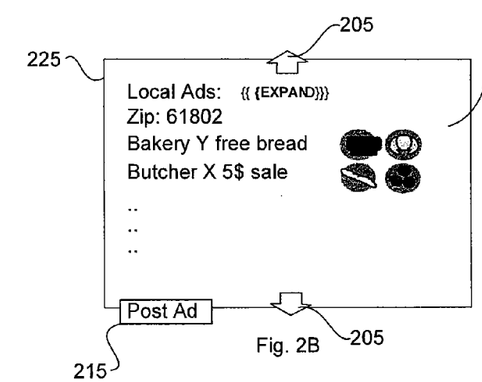
FIG. 2B is an embodiment of a localized advertisement region of the exemplary web page of FIG. 2A.
Figure 2C:
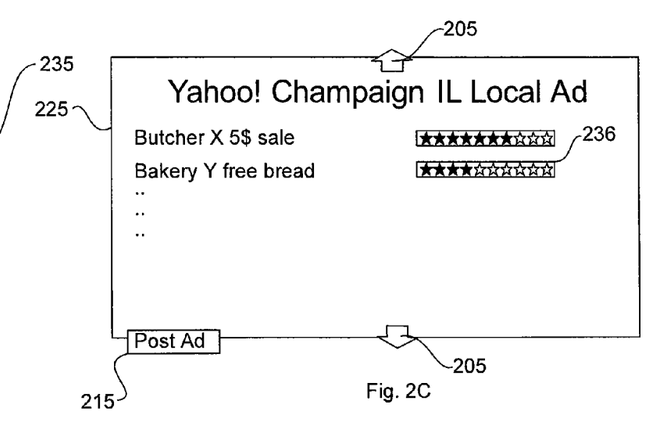
FIG. 2C is another embodiment of a localized advertisement region of the exemplary web page of FIG. 2A.

The web page 200 also includes a localized advertisement region 225. The localized advertisement region 225 is utilized to display localized advertisements that are advertisements from advertisers 130 (FIG. 1) situated in the same geographic location as a user 125 operating a browser (FIG. 1) through which the web page 200 is viewed. In some implementations, the localized advertisement region 225 may display a different localized advertisement each time the web page 200 is refreshed. In other implementations, the localized advertisement 225 region may display a number of localized advertisements. For example, the localized advertisement region 225 may be subdivided into different regions that display different localized advertisements. Further, the advertisements displayed in the localized advertisement region 225 may be graphical, textual in nature or may be multimedia advertisements including video, audio and other features. For example, as shown in FIG. 2B, localized advertisements may be shown as a list and may include graphical elements 235. As shown in FIG. 2C, the localized advertisements may be shown as a list and sorted according to a ranking associated with a given local advertiser. Rank indicators 236 may be provided to show the relative ranking of a localized advertisement. The localized advertisement may be displayed in yet other ways.

In yet other implementations, the localized advertisement region 225 is configured to display multiple localized advertisements by scrolling or flashing the advertisements in sequence. For example, each localized advertisement may be displayed for a period of time, such as 2 seconds. Then, a next localized advertisement may be shown. Scrolling of the localized advertisements may occur automatically. In some implementations, scroll buttons 205 may be provided that enable a user 125 to scroll through a list of localized advertisements. The scroll buttons 205 may be shown on the left and right side of the localized advertisement region 224, as shown in FIG. 2A. The scroll buttons 205 may also be shown on the top and bottom of the local advertisement region 224, as shown in FIGS. 2B and 2C, or a different region. Moreover, any combination of scroll buttons 205 may be provided. The scroll buttons 205 enable the user 125 to search for localized advertisements that are of interest to the user 125.

The localized advertisement region 225 may also be configured to enable a user 125 to set display preferences for the localized advertisement region. For example, a preferences button 210 may be provided. Clicking the preferences button 210 may cause a popup window 230 to appear. The popup window 230 may include controls that enable controlling the way in which advertisements are displayed in the localized advertisement region 225. For example, the controls may enable displaying localized advertisements as shown in any of FIGS. 2A, 2B, and 2C, or in a different manner.

The popup window 230 may include other controls, such as controls that enable specifying the content of the information displayed in the localized advertisement region 225. For example, the settings may enable specifying a type of advertisement to be displayed, such as grocery advertisements, automobile advertisements, or other types of advertisements. In some implementations, the settings may enable specifying a geographic location of interest, such as a specific zip code.

This may enable a user 125 to view localized advertisements associated with different zip codes.

The popup window 230 may also include controls that enable specifying the method for displaying the information in the localized advertisement region 225. For example, the amount of time a given advertisement is displayed, such as 1 second or 2 seconds, may be specified. Whether the advertisements scroll smoothly across the localized advertisement region 225 or whether the advertisements flash may be specified. The number of advertisements to display may be specified. Other specifications may be provided.

In some implementations, the localized advertisement region 225 enables the rating of a given localized advertisement. For example, browser code operating on the browser that operates on the browser device 120 may be configured to notify the front-end server 105, the advertisement server 110, or a different server, each time the user 125 clicks on the localized advertisement region 225. The server may associate a rating with a number of clicks a given localized advertisement has received. For example, the higher the number of clicks, the higher the rating.

Figure 2D:
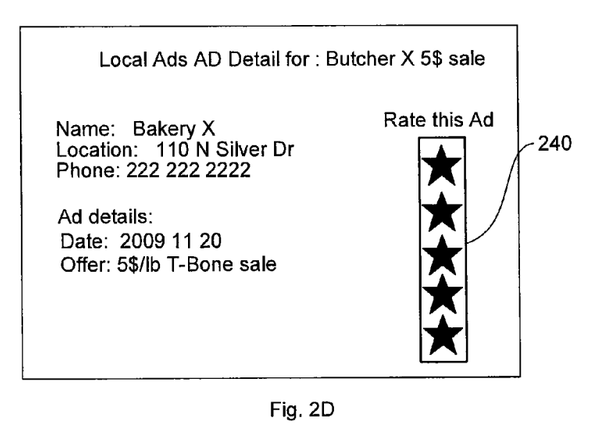
FIG. 2D is an exemplary pop up window the enables ranking a localized advertisement.

The localized advertisement region 225 may also be configured to enable a user 125 to manually rate a localized advertisement. For example, an input field or group of rating buttons may enable a user 125 to rate a localized advertisement on a scale, such as 1 to 5, where 5 is the highest rating. In some embodiments, a rating scale 240 may be provided that enables a user to rate an advertisement, as illustrated in FIG. 2D. For example, the user may select a localized advertisement displayed in the localized advertisement region 225, which may cause more details about the localized advertisement to be displayed in the localized advertisement region 225, such as the name, location and phone number associated with the advertiser, and details related to the product or service being advertised. The user may select a rating that may then be communicated to the front-end server 105 (FIG. 1) and/or the advertisement server 110 (FIG. 1) and taken into consideration in determining a weight to be associated with the localized advertisement.

The rating information associated with a given advertisement may be utilized to control which advertisements are displayed to a user 125. For example, a first user's ratings of an advertisement may be utilized by the system 100 when selecting localized advertisements to be communicated to a second user that is associated with the first user. For example, the first user and second user may be associated via a social network, such as Facebook®. The first user may highly rate a given advertisement. In this case, the highly rated advertisement may be given an increased weight by the system 100 when deciding whether to communicate the advertisement to the second user. The second user may share similar interests with the first user and, therefore, may benefit from ratings provided by the first user. Controls for enabling this behavior may be provided along with the other user preferences noted above.

Alternatively or in addition, the rating may be based on a number of clicks a given advertisement has received from other users that are in the same social network as the first user.

In yet other implementations, the rating may be based on the amount of time a given user spends looking at the details of an advertisements. For example, a user may select an advertisement to see more details about the advertisement, such as those illustrated in FIG. 2D. A timer operating on the browser device may be utilized to measure the amount of time that elapses between the time when the user selects the advertisement to the time the user selects a different link or region of the browser. The value of the timer may be communicated to the front-end server 105 and/or the advertisement server 110 (FIG. 1) and averaged with timer values and/or other rankings associated with other users to affect the rating associated with the advertisement. For example, the rating associated with a given advertisement may be calculated according to the following equation:

$$\text{Rating} = (\text{Average Rating of all user that graded the system}) + (\text{Number of Clicks}) + (\text{Total Time spent in Ad Detail in seconds}) \%60$$

The rating formula may be expressed differently. For example, each factor may be multiplied by a constant or weighting coefficient to increase or decrease the relative importance of the factor.

In yet other implementations, the localized advertisement region 225 may enable a user 125 to post an advertisement. For example, a link 215 to a web page for uploading an advertisement may be provided.

Figure 3:
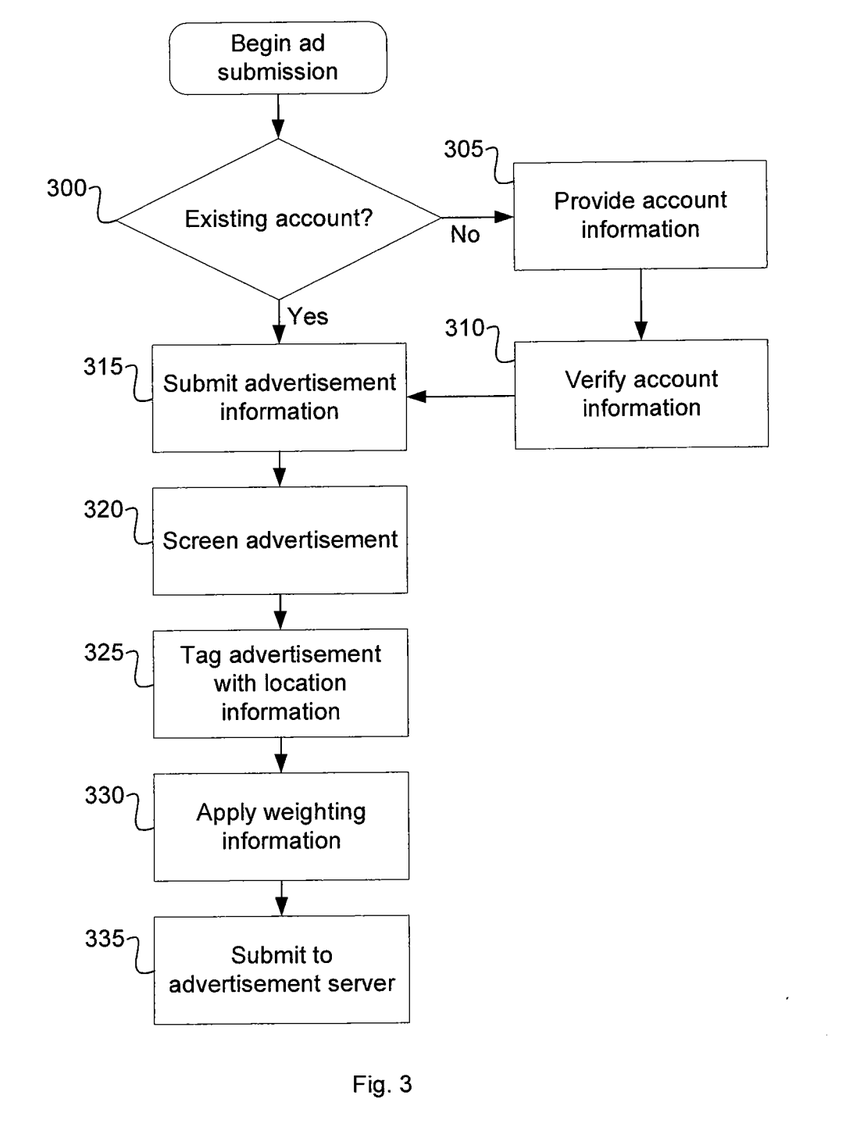
FIG. 3 is a flow diagram showing a group of operations associated with the submission of an advertisement that may be performed by the system of FIG. 1.

FIG. 3 is flow diagram showing a group of exemplary operations associated with the submission of an advertisement that may be performed by the system 100 of FIG. 1. At block 300, a web page (not shown) for submitting an advertisement may be communicated to an advertiser. The web page may include fields that allow the advertiser to specify a user name and/or password if the advertiser has an account with the system 100. Alternatively, an unregistered advertiser may indicate, via the web page, that a new account is to be created.

If at block 300, an advertiser account does not exist, then at block 305, the advertiser may provide account information. For example, the advertiser may provide a user name and password. The advertiser may specify information that describes the advertiser's business, such as grocer or mechanic. The advertiser may also specify an address associated with the business.

At block 310, the information provided by the advertiser may be verified. For example, the system 100 may analyze the address to verify that it actually exists and is registered to the business specified. If the information cannot be verified, the advertiser may be prevented from going any further and may be given an opportunity to provide verifiable information.

If at block 300, the advertiser has an existing account or the advertiser account is verified at block 310, then at block 315, the advertiser may submit information that defines the advertisement. For example, a web page with input fields for uploading advertisement information may be provided. The advertiser may upload the content of the advertisement, such as the graphics and/or text that define the advertisement. The advertiser may be prompted with a payment screen that enables the advertiser to pay a one time fee for positing the advertisements. In some implementations, the fee enables positing the advertisement for a fixed time, such as 1 day, 1 week, or a longer or shorter period of time.

In some implementations, the advertiser is also presented with options for increasing the likelihood that an advertisement will be displayed. For example, the advertiser may increase the frequency at which an advertisement is displayed by paying an increased fee. In the case where there are a number of advertisers advertising locally via the system 100, a given advertiser may increase the likelihood that his advertisement will be displayed first in the list of advertisements by paying an increased fee. The increased fee payment may be utilized by the system 100 to increase the weight associated with the advertisement.

At block 320, the advertisement may be screened. For example, text recognition software may be utilized to screen the advertisement for profanity. In some implementations, a human reviewer may analyze the advertisement to verify that the advertisement is suitable for distribution.

At block 325, the advertisement may be tagged or associated with location information. The location information corresponds to a geographic location associated with the advertiser. For example, the location information may correspond to the zip code associated with the advertiser. The location information may correspond to location information provided by the advertiser. In addition or alternatively, the location information may be extrapolated by a location server, such as the location server 115 of FIG. 1, based on the IP address associated with the browser through which the advertiser submitted the advertisement. The location information may be used in later operations to match the advertisement to a user based on the location of the user.

At block 330, weighting information may be associated with the advertisement. As discussed above, the weighting information may be utilized to increase the frequency or length of time an advertisement is displayed, or to change the order in which the advertisement is displayed relative to other advertisements. For example, in some implementations, a given advertisement may be set to automatically expire at a given time, such as 30 days from the date it is posted or on an absolute date. An advertiser may request an upgrade to his advertisement during the submission advertisement submission or a different time to extend the amount of time his advertisement may be shown to users.

At block 335, the advertisement and its associated location and weighting information may be submitted to an advertisement server 110 (FIG. 1) and stored to an advertisement database, such as the advertisement database 135 of FIG. 1.

Figure 4:
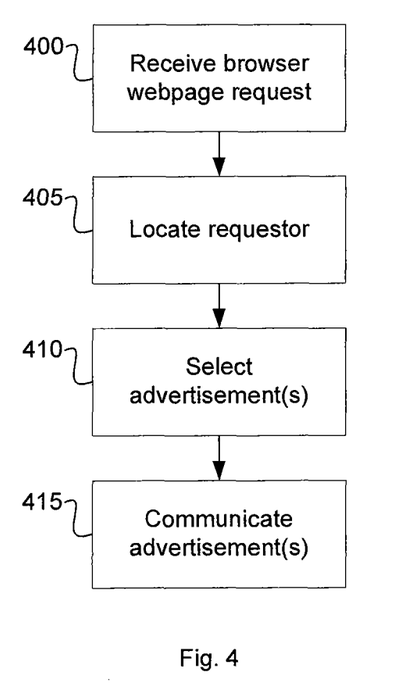
FIG. 4 is a flow diagram showing a group of operations that may be performed by the system of FIG. 1 when serving an advertisement.

FIG. 4 is a flow diagram showing group of operations that may be performed by the system 100 when serving an advertisement. At block 400, a user may request a web page via a browser. For example, a user may, via a browser, navigate to a home page, such as a Yahoo!® front page.

At block 405, the location associated with the user may be determined. For example, a location server may analyze an IP address associated with the web page request to determine the location of the user associated with the browser. In addition or alternatively, the address associated with the user may have been previously determined. For example, the location associated with the user may correspond to an address provided by the user during a registration process. In another example, user location information may be determined and provided by a wireless communication network using Global Positioning System methods or by associating the user's location with the nearest wireless base station. In other implementations, the location information may correspond to a preference specified by the user. The preferences may enable specifying a geographic location of interest, such as a specific zip code. This may enable a user 125 to view localized advertisements associated with different zip codes.

At block 410, advertisements tagged with location information that matches the user's location may be selected. Selection of the advertisement is described below and in FIG. 5.

At block 415, one or more selected advertisements may be communicated to the user along with the rest of the information that defines the requested web page. The selected advertisements may be displayed in a region of the web page reserved for localized advertisements, such as the local advertisement region 225 of the web page 200 of FIG. 1. The selected advertisements may be scrolled, flashed, displayed simultaneously, and/or displayed in a different manner in the local advertisement region 225.

Figure 5:
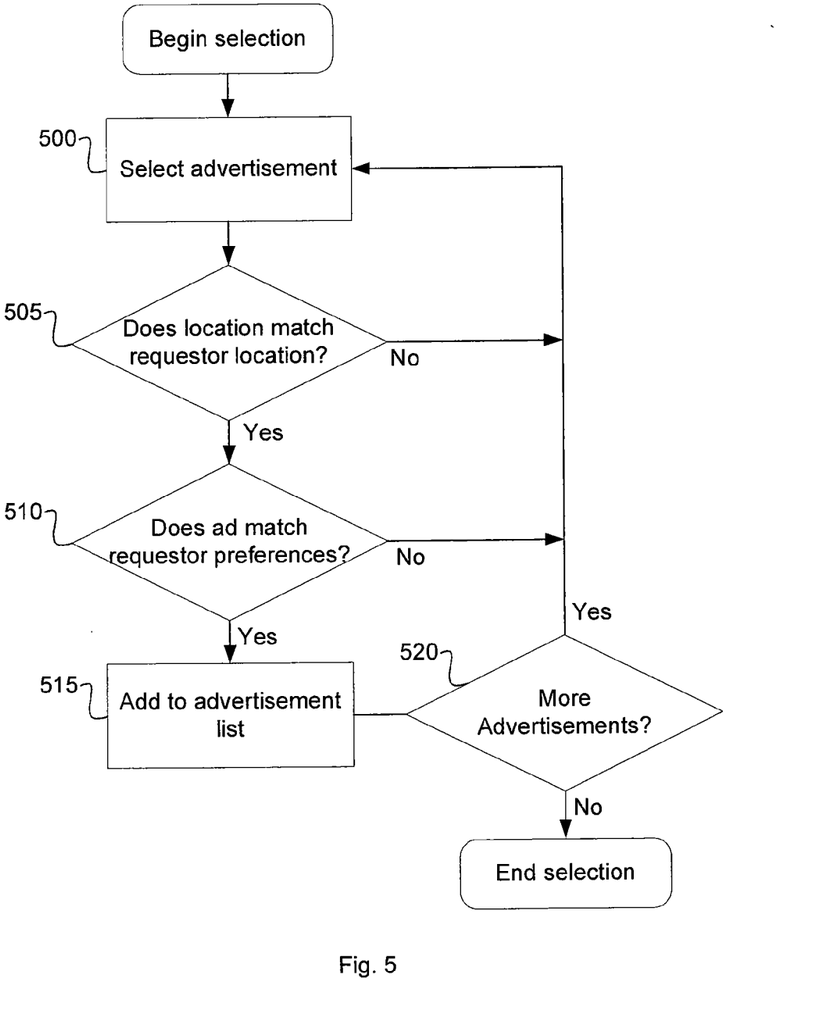
FIG. 5 is a flow diagram showing a group of operations that may be performed by the system of FIG. 1 when selecting advertisements.

FIG. 5 is a flow diagram showing a group of operations that may be performed by the system 100 when selecting advertisements. At block 500, an advertisement from an advertisement database may be selected. The advertisements may be randomly selected from the advertisement database or selected in a different manner. In addition or alternatively, the advertisements may be selected on the basis of the weight associated with each advertisement. For example, an advertisement in which an advertiser paid a premium may be selected over other advertisements. This increases the probability and/or frequency at which such an advertisement is selected.

At block 505, location information associated with the advertisement may be compared with location information associated with a user as described herein. If the advertisement location information does not match the user's location, then a different advertisement may be selected at block 500. For example, the zip code associated with advertisers business may be compared with the zip code in which the browser device is located.

If the advertisement location information does match the user's location, then at block 510, information that defines the content of the advertisement may be compared with user preferences. The user preferences may have been previously associated with the user as described above and in FIG. 2A. For example, a user that only wishes to see grocery advertisements may not be shown advertisements associated with auto mechanics. If a given advertisement does not match the user's preferences, then the next advertisement may be selected at block 500.

If the advertisement does match the user's preferences, then at block 515, the advertisement may be added to a list or queue of advertisements.

If at block 520 there are more advertisements available in the advertisement database, then the operations may repeat from block 500. If there are no more advertisements available at block 520, the operations may end and the advertisement list generated at block 515 may be communicated to the user, for example, at block 415 as described above.

In some implementations, the operations may cease after a predetermined number of advertisements have been found. For example, it may not be practical to show more than 15 advertisements to a user, in which case the operations may stop after 15 advertisements are found. In other implementations, the number of advertisements selected may be based on user preferences. For example, a user may specify a limit for the number of advertisements to display via the preference options provided on the web page described above and shown in FIG. 2A.

Figure 6:
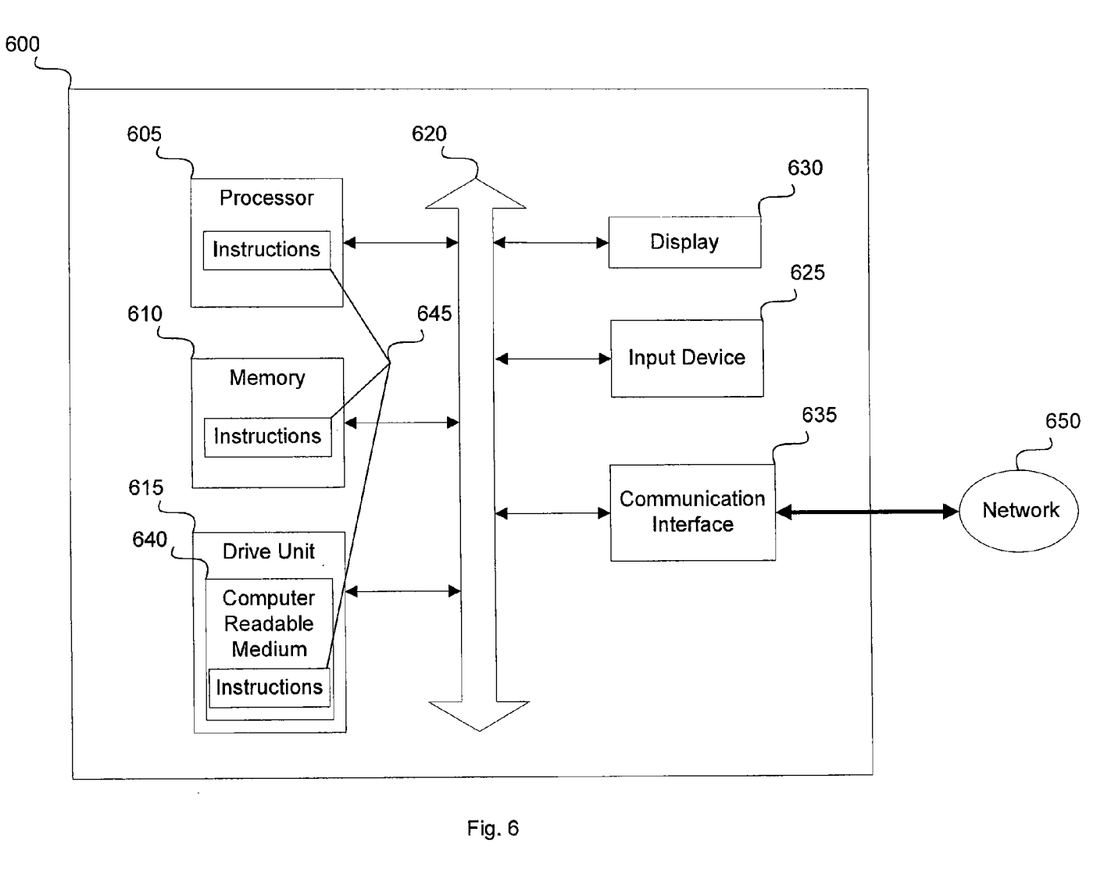
FIG. 6 illustrates a general computer system, which may represent any of the computing devices referenced herein.

FIG. 6 illustrates a general computer system 600, which may represent the front-end server 105, the advertisement server 110, the location server 115, the browser device 120, or any other computing devices referenced herein. The computer system 600 may include a set of instructions 645 that may be executed to cause the computer system 600 to perform any one or more of the methods or computer-based functions disclosed herein. The computer system 600 may operate as a stand-alone device or may be connected, e.g., using a network, to other computer systems or peripheral devices.

In a networked deployment, the computer system 600 may operate in the capacity of a server or as a client-browser device in a server-client user network environment, or as a peer computer system in a peer-to-peer (or distributed) network environment. The computer system 600 may also be implemented as or incorporated into various devices, such as a personal computer or a mobile device, capable of executing a set of instructions 645 (sequential or otherwise) that specify actions to be taken by that machine. Further, each of the systems described may include any collection of sub-systems that individually or jointly execute a set, or multiple sets, of instructions to perform one or more computer functions.

The computer system 600 may include a memory 610 on a bus for communicating information. The advertisement database 135 may be stored in the memory 610. In addition, code operable to cause the computer system to perform any of the acts or operations described herein may be stored in the memory 610. The memory 610 may be a random-access memory, read-only memory, programmable memory, hard disk drive or any other type of memory or storage device.

The computer system 600 may include a display 630, such as a liquid crystal display (LCD), a cathode ray tube (CRT), or any other display suitable for conveying information. The display 630 may act as an interface for the user to see the functioning of the processor 605, or specifically as an interface with the software stored in the memory 610 or in the drive unit 615.

Additionally, the computer system 600 may include an input device 625, such as a keyboard or mouse, configured to allow a user to interact with any of the components of system 600.

The computer system 600 may also include a disk or optical drive unit 615. The disk drive unit 615 may include a computer-readable medium 640 in which one or more sets of instructions 645, e.g. software, can be embedded. Further, the instructions 645 may perform one or more of the operations as described herein. The instructions 645 may reside completely, or at least partially, within the memory 610 and/or within the processor 605 during execution by the computer system 600. The memory 610 and the processor 605 also may include computer-readable media as discussed above.

The computer system 600 may include a communication interface 635 that enables communications via a network 650. The network 650 may include wired networks, wireless networks, or combinations thereof. The communication interface 635 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

As shown above, the system enables serving localized advertisements. For example, the system is configured to receive data that defines an advertisement from an advertiser and to determine a geographic location of the advertiser. The system is also configured to receive a request to serve an advertisement from a browser operated by a user and to determine a geographic location associated with the user. The system then communicates the advertisement to the browser if the geographic location associated with the user matches the geographic location of the advertiser.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

We claim:

1. A method for serving advertisements in a networked system, the method comprising:

receiving, at a server, one or more criteria from a user via a browser, the one or more criteria including one or more preferences of the user;

receiving, at the server, data that defines advertisements from one or more advertisers;

determining, by the server, one or more attributes of the one or more advertisers;

receiving, at the server, a request to serve advertisements from the browser;

communicating, by the server, the advertisements to the browser if the one or more criteria from the user match the one or more attributes of the one or more advertisers; and communicating browser code to the browser that is executable by the browser to cause the browser to display a localized advertisement region on a user home page, wherein the user home page is a web portal, and wherein the localized advertisement region includes:

an area configured to display one or more of the advertisements one or more at a time sequentially, a first icon, wherein the first icon, when clicked on by the user, is configured to cause the browser to scroll manually through the advertisements one or more at a time sequentially, and a second icon, wherein the second icon, when clicked on by the user, is configured to cause the browser to display an interface within the user home page, wherein the interface is configured to:

receive user input that includes a timing value per preference of the user, resulting in one or more timing values; and cause the browser to display the advertisements one or more at a time sequentially according to the one or more timing values, wherein the one or more timing values includes: a first speed associated with a speed of switching a displayed ad to another ad resulting from the manual scrolling by the click on the first icon, and a second speed corresponding to automatic scrolling of the advertisements one or more at a time sequentially.

2. The method of claim 1, wherein the one or more criteria from the user include one or more of a geographic location preference of the user, a real-time geographic location of the user, or a non-geographic location preference of the user.

3. The method of claim 1, wherein the one or more attributes of the one or more advertisers include one or more of a respective geographic location of the one or more advertisers or a non-geographic location attribute.

4. The method of claim 1, wherein the interface is configured to receive user input includes a pop up window.

5. The method of claim 1, wherein the interface is configured to:
receive user input that includes an advertising subject matter preference; and
cause the browser to display the advertisements according to the advertising subject matter preference.

6. The method of claim 1, wherein the interface is configured to:
receive user input that includes a geographic location preference of an advertiser; and
cause the browser to display the advertisements according to the geographic location preference.

7. The method of claim 6, wherein the geographic location preference includes a zip code.

8. A system comprising one or more servers configured to:
receive one or more criteria from a user via a browser, the one or more criteria including one or more preferences of the user;
receive data that defines advertisements from one or more advertisers;
determine one or more attributes of the one or more advertisers;
receive a request to serve advertisements from the browser;
communicate the advertisements to the browser if the one or more criteria from the user match the one or more attributes of the one or more advertisers; and
communicate browser code to the browser that is executable by the browser to cause the browser to display a localized advertisement region on a user home page, wherein the user home page is a web portal, and
wherein the localized advertisement region includes:
an area configured to display one or more of the advertisements one or more at a time sequentially,
a first icon, wherein the first icon, when clicked on by the user, is configured to cause the browser to scroll manually through the advertisements one or more at a time sequentially,
a second icon, wherein the second icon, when clicked on by the user, is configured to cause the browser to display an interface within the user home page, wherein the interface is configured to:
receive user input that includes a timing value per preference of the user, resulting in one or more timing values; and
cause the browser to display the advertisements one or more at a time sequentially according to the one or more timing values, wherein the one or more timing values includes: a first speed associated with a speed of switching a displayed ad to another ad resulting from the manual scrolling by the click on the first icon, and a second speed corresponding to automatic scrolling of the advertisements one or more at a time sequentially.

9. The system of claim 8, wherein the one or more criteria from the user include one or more of a geographic location preference of the user, a real-time geographic location of the user, or a non-geographic location preference of the user.

10. The system of claim 8, wherein the one or more attributes of the one or more advertisers include one or more of a respective geographic location of the one or more advertisers or a non-geographic location attribute.

11. The system of claim 8, wherein the interface is configured to receive user input includes a pop up window.

12. The system of claim 8, wherein the interface is configured to:
receive user input that includes an advertising subject matter preference; and
cause the browser to display the advertisements according to the advertising subject matter preference.

13. The system of claim 8, wherein the interface is configured to:
receive user input that includes a geographic location preference of an advertiser; and
cause the browser to display the advertisements according to the geographic location preference.

14. The system of claim 13, wherein the geographic location preference includes a zip code.

15. A non-transitory computer-readable medium that includes processor executable instructions executable to:
operate and display a browser that is operable by a user;
send, to a server, a request for the server to send advertisements to the browser;
receive, from the server, one or more criteria from the user, the one or more criteria including one or more preferences of the user;
receive, from the server, one or more attributes of the advertisements;
receive, from the server, the advertisements sent from the server, if the one or more criteria from the user match the one or more attributes of the advertisements; and
receive, from the server, additional instructions executable by the browser to cause the browser to display a localized advertisement region on a user home page, wherein the user home page is a web portal, and
wherein the localized advertisement region includes:
an area configured to display one or more of the advertisements one or more at a time sequentially,
a first icon, wherein the first icon, when clicked on by the user, is configured to cause the browser to scroll manually through the advertisements one or more at a time sequentially, and
a second icon, wherein the second icon, when clicked on by the user, is configured to cause the browser to display an interface, wherein the interface within the user home page, is configured to:
receive user input that includes a timing value per preference of the user, resulting in one or more timing values; and
cause the browser to display the advertisements one or more at a time sequentially according to the one or more timing values, wherein the one or more timing values includes: a first speed associated with a speed of switching a displayed ad to another ad resulting from the manual scrolling by the click on the first icon, and a second speed corresponding to automatic scrolling of the advertisements one or more at a time sequentially.

16. The computer-readable medium of claim 15, wherein the one or more criteria from the user include one or more of a geographic location preference of the user, a real-time geographic location of the user, or a non-geographic location preference of the user.

17. The computer-readable medium of claim 15, wherein the one or more attributes of the advertisements include one or more geographic locations of one or more respective advertisers or one or more non-geographic location attributes of the one or more respective advertisers.

18. The computer-readable medium of claim 15, wherein a sequence to display the advertisements is based on ratings associated respectively with the advertisements.

19. The computer-readable medium of claim 18, wherein the ratings associated respectively with the advertisements are based at least on one or more of web browsing behaviors of the user, actual distance between a location of an advertiser and a current location of the user, or an advertising subject matter preference inputted by the user.

20. The computer-readable medium of claim 15, wherein the interface is configured to:
   receive user input that includes an advertising subject matter preference; and
   cause the browser to display the advertisements according to the advertising subject matter preference.

21. The computer-readable medium of claim 15, wherein the interface is configured to:
   receive user input that includes a geographic location preference of an advertiser; and
   cause the browser to display the advertisements according to the geographic location preference.

22. The computer-readable medium of claim 21, wherein the geographic location preference includes a zip code.

\* \* \* \* \*